Jan. 27, 1959     G. S. BERNYK     2,871,057
HOSE BASKET
Filed Nov. 22, 1955
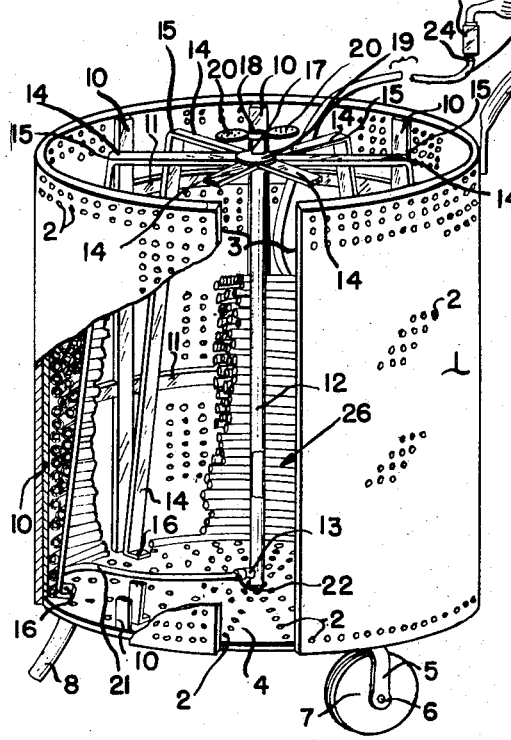
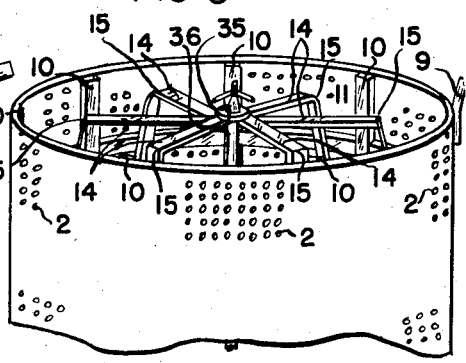
FIG-1
FIG-2
FIG-3
FIG-4
FIG-5
INVENTOR.
GEORGE S. BERNYK
BY Toulmin & Toulmin
ATTORNEYS

United States Patent Office 2,871,057
Patented Jan. 27, 1959

2,871,057

HOSE BASKET

George S. Bernyk, Dayton, Ohio

Application November 22, 1955, Serial No. 548,421

3 Claims. (Cl. 299—78)

The present invention relates to water hose containers and lawn sprinkler accessories, and more particularly to the combination of a basket form of receptacle containing coils of hose, together with a sprinkler mounted on the receptacle and to which either end of the hose can be conveniently connected or disconnected through suitable piping structure.

The primary object of the invention is to provide a portable carriage and container for transporting coils of hose over a lawn and to facilitate connection between the hose and sprinkler, or between the hose and the faucet.

Another object is to provide a retaining device for water hose in which the hose is kept in a coiled condition when water is passing therethrough and any number of turns can be uncoiled to extend the length of the free portion of the hose.

Still another object is to provide a combined sprinkler and hose apparatus in which the hose is left in a coiled state when in service but can be readily detached from the sprinkler to provide an extension for connection to a faucet or to a nozzle.

Another object is to provide a basket form of compartment for receiving and storing a coiled hose, the compartment being so constructed that the hose remains therein during the hosing operation and any portion of the hose can be removed from or added to the coiled portion during operation.

A more particular object is to provide a perforated basket for a hose in coiled state with guiding means within the basket to force the coils to be deposited one on the other in orderly manner and to permit the ready outlet of excess water through the sides and bottom of the basket so that air can be readily admitted to the basket and between the various convolutions in order to dry the hose in place.

Still another object is to provide a receptacle for a hose in coiled state, the receptacle forming a support for a lawn sprinkler, together with a water-carrying conduit located in the center of the receptacle to which one end of the hose can be readily connected or disconnected without uncoiling the hose.

A further object is to provide a water pervious basket for a coiled hose, together with an inexpensive guiding structure by which the coils are caused to lay one on the other in orderly fashion without kinks, together with providing access at the bottom of the basket to make connection of any kind with respect to the lower portion of the hose without disturbing the coils of hose, the basket being mounted on casters to provide portability to the hose as a whole.

In carrying out the above objects, I provide in brief, a cylindrical form of portable container, made of mesh or perforated metal or plastic material, with suitable guides for constraining the hose to fall neatly in place when wrapped around the guiding means, together with a centrally located upright pipe detachably connected to the hose for supporting a sprinkler device.

Other objects and features will be apparent as the specification is perused in connection with the accompanying drawings, in which:

Figure 1 represents a perspective view of the improved hose container combined with a lawn sprinkler device which can be optionally connected to the hose;

Figure 2 is a modified form of the container and showing the manner in which the hose can be used without the sprinkler;

Figure 3 illustrates still another type of container or basket for receiving the hose;

Figure 4 is a sectional view of a cylindrical coupling member or adapter for connecting the hose either with the faucet, the sprinkler pipe or a nozzle; while Figure 5 represents a view of the improved basket container with a sprinkler device resting thereon ready to receive the upper end of the hose contained within the basket.

Referring more particularly to Figure 1, reference character 1 designates a cylindrical sheet of metal or plastic, preferably perforated as indicated at 2, and more especially perforated at the lower ends of the cylinder. A longitudinally extending space or slot 3 is left between the ends of the cylinder so that the latter is not perimetrically complete. The width of this slot should be sufficient to permit the insertion of the hand at any place along the cylinder, but more particularly at the lower end where certain connections and disconnections of the hose are made, for purposes described hereinafter.

The lower end of the cylinder is closed by a bottom member 4 which also is perforated and can be made of metal or plastic material and secured to the cylinder in any well known manner at its edge. This bottom member is provided at convenient places with two Y-shaped brackets 5 which have bearings 6 on which casters 7 rotate. A peg-leg support 8 is also secured in any suitable manner to the bottom in such a way that the cylindrical member or basket 1 is supported at three points, of which two comprise the casters 7 and the other is the peg-leg member 8.

A pipe form of handle 9 may be secured in any suitable or well known manner to the upper edge of the cylinder, the arrangement being such that when the operator presses down on the handle, the cylinder is temporarily supported only by the casters so that the entire basket can be readily moved to any position on the lawn or other desired place.

At equidistantly spaced positions on the interior of the cylinder there is a number of upright members 10 which serve to render the cylinder 1 rigid in the longitudinal direction. This cylinder may be made of thin material, metal or plastic, in order to reduce the weight as much as possible so that the members 10 are desirable in order to render the cylinder more rigid.

A pair of circumferentially extending bars 11 may encircle the interior periphery of the cylinder at spaced positions so that these bars, together with the bottom 4, serve to maintain the cylindrical shape of the basket, notwithstanding the thinness of the material out of which the basket or receptacle is made.

There is a pipe 12 extending centrally and longitudinally of the cylinder, the pipe being secured to the bottom which serves also as a closure member for the pipe. A conduit 13 extends outwardly from the lower end of the pipe, this conduit terminating in a male nipple. The upper end of the pipe is held rigidly in its central position by means of radially extending arms 14, of which seven are illustrated, these arms being bent as indicated at 15 and then extending angularly downward and outwardly to terminate in an inwardly extending lug 16.

This lug is screwed or otherwise secured to the bottom member 4.

The pipe 12 extends upwardly past the horizontal portions of the arms 14 and connects with the interior pipe 17 of a standard form of sprinkler head 18. The head 18 is permitted to rotate on bearings (not shown) which are supported on a flange member 19 which rests on the horizontal portions 14 of the brace members. It is obvious that when water under pressure is supplied to the conduit 13 at the lower end of the pipe, the water will pass through the head of the sprinkler and will emerge at the openings 20 in the vanes of the sprinkler, causing the latter to rotate in the well known manner.

It has been explained that the vertical portions of the arms 14 extend upwardly and inwardly with respect to the bottom member 4 so that a triangularly shaped space is left between the interior surface of the cylinder 1 and the arms 14. The distance between the lower end of each arm 4 and the closest surface of the cylinder 1 should be such that not more than one coil or turn of hose can be accommodated at any level of the hose. But as the coils extend upwardly, more and more turns can be received between the arms and the cylinder. The reason for the single turn coil at the bottom is to facilitate the making of the connections and disconnections with respect to the central pipe 12.

The lower end of the hose is brought out as a free length 21 by inserting the hand in the slot 4 and the end of the hose terminates in a female coupling 22 for a detachable connection with the male coupling 13 of the pipe 12. Assuming that the hose is coiled within the cylinder 1, the upper end is brought out from the top as a free length 23 and is provided with a male coupling 24 for attaching through an adapter to the screw threads of a faucet 25.

A suitable form of adapter is shown in Fig. 4, which may take the form of a tube 25a of metal threaded on the interior as indicated at 25b, so that the male coupling 13 can be threaded into the adapter approximately one-half the length, leaving the other half to receive the threaded portion of the faucet.

Thus, when the faucet is opened, water under pressure passes through the hose designated generally at 26, thence through the free length 21 at the bottom, up through the pipe 12 to the lawn sprinkler 18. This causes the blades to rotate in the usual manner. The water is thrown out into space beyond the cylinder 1 and the water that would normally collect within the cylinder runs off through the openings in the bottom member so that even the lawn directly under the basket is watered in sufficient manner. The coil basket can then be moved to a new location by simply withdrawing a greater length of hose 23 out of the basket, and by pressing down on the handle 9, the basket and hose can be rolled on the casters 7.

When the lawn has been sufficiently watered, the free length 23 of the hose is then coiled back into the basket and the entire receptacle and its contents are moved to a storage place. It is apparent that any free water can drain from the convolutions of hose through the openings in the bottom and that air is allowed freely to circulate through the convolutions of the hose on account of their orderly positions within the basket, so that there is no tendency for the hose to rot, even if stored for a long period of time. The cylinder 1 is inexpensive to make since it can be wrapped around the bottom member 4 in sheet form and the perforations put into the sheet before it is attached to the bottom.

In Figure 2, the general construction is the same as was described in connection with Figure 1, except that the cylinder 27 is perimetrically complete at the bottom and the slot 28 does not extend completely to the bottom edge of the cylinder but stops short of that edge and is preferably provided with a curvilinear end 29 so as to eliminate the possibility of sharp corners.

In this figure the lower end of the coil has been disconnected from the sprinkler column and has been brought out to make a connection with the faucet 25. As in the case of Figure 1, the hand is inserted into the slot 28 to bring out the free portion 21 of the hose to make the connection. A free end portion can also be unwrapped from the top of the basket and a nozzle 32 attached thereto in the usual manner, so that the hose in this case can be used in the regular way for wetting the lawn. When this watering operation is completed, the upper portion of the hose is again coiled within the basket and left in this position to permit the excess water to drain off and the hose can be dried by the air which finds ready ingress through the perforations and also at the top of the basket.

Figure 3 shows a hose basket similar to Figures 1 and 2, except that the cylindrical portion is made of wire mesh 33 instead of perforated metal or perforated plastic sheet. The mesh terminates at a distance above the bottom 4, as indicated at 34, so as to readily allow the insertion of the hand at any place about the entire periphery to either pull out the free end of the hose 21, as described in Figure 2, or to connect this end of the hose to the sprinkler upright member 12, as was described in connection with Figure 1. If desired, reinforcing bands (not shown) may be provided at the uppermost and the lowermost edge of the mesh so as to prevent any danger of scratching the hand.

In Figure 5 I have shown the manner in which my improved basket can be used as a support for a conventional form of lawn sprinkler. In this case the flange 35 of a conventional sprinkler is clamped, screwed or otherwise secured to the horizontal portion of the arms 14. A free length of the coiled hose is then unwound at the top of the basket and a connection made to the inlet conduit 36 of the sprinkler, while a free length at the lower end of the hose is connected to the faucet 25.

From the foregoing, it is evident that I have disclosed an improved form of basket or receptacle for coils of hose in which the coils fall orderly in place on account of the internal guiding structure, and in which water can be run through the hose while in a coiled condition and connections made either to a sprinkler forming an integral part of the portable basket or to a conventional sprinkler which is temporarily attached to the basket. The latter is made of some light material as sheet steel or thin plastic perforated, or made of wire mesh suitably reinforced, and provision is made at the bottom of the basket for the insertion of the hand by which connections and disconnections and the withdrawal of a free length of hose are accomplished.

When the hose is not in use, it remains in a coiled condition within the basket and, due to the absence of kinks, the water within the entire length of the hose will drain out, assuming that the free end of the hose at the bottom is open, and this excess water will run out of the basket through the perforations in the bottom plate or through the annular hand openings at the bottom. Consequently, the hose remains in a dry condition when stored and free access to the air is present so that rot of the rubber is practically impossible. The basket is made extremely portable by the use of a handle and the fact that it is carried on casters.

It should be further noted that when the free end of the coil is brought out from the bottom, for example to make connection with a faucet 25 as shown in Figure 2, the casters 7 and the peg-leg 8 will prevent any lateral movement of the basket as a whole, and if the casters are spaced far enough out diametrically, there is absolutely no danger whatsoever of having the basket tip when a reasonable pull is exerted on the free end of the hose 21 or by reason of the fact that a greater part of the hose is located at the upper end of the basket.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desire to secure by Letters Patent, is:

1. A container for a hose comprising a cylindrical member of perforated material against which the outer surfaces of the coils of hose rest, guide members within the cylinder extending the length thereof against which the inner surfaces of the coils rest, a tubular member extending centrally and lengthwise of the cylinder, said guide members being equidistantly spaced and extending from said tubular member in a direction at right angles thereto and then bent to extend angularly downward in the same direction as said member, the angular portion of said members being presented to the interior surface of the cylinder to leave triangular spaces, of which the lowermost portions of the spaces are adapted to receive the inner surface of only one coil of the hose.

2. A basket for a coiled hose, said basket being formed of perforated material in cylindrical form, a bottom on said basket formed of perforated material, means within the basket for guiding the convolutions of hose against the inner surface of the basket, said means comprising a plurality of separate guide members distributed about and extending along the inner surface of the basket but spaced at increasingly greater distances from the basket in moving from the bottom of the basket to the top thereof, the distance between the lower portion of the basket and each adjacent member being sufficiently small as to admit only one coil of hose.

3. A basket for a coiled hose, said basket having rounded sides and a bottom member with water openings distributed throughout the sides and bottom, means within the basket for guiding the convolutions of hose against the sides of the basket, a central tubular column in said basket, the lower end of the hose communicating with said column, and a space between the lower edge of the sides of the basket and the bottom member of the basket to permit insertion of the hand for making a connection and a disconnection of the lower end of the hose.

References Cited in the file of this patent

UNITED STATES PATENTS

| | | |
|---|---|---|
| 1,064,883 | Bergland | June 17, 1913 |
| 1,653,103 | Keys | Dec. 20, 1927 |
| 1,790,755 | Lally | Feb. 3, 1931 |